United States Patent [19]

Griffin

[11] 4,301,881
[45] Nov. 24, 1981

[54] VEHICLE DRIVE SYSTEM

[76] Inventor: Hugh A. Griffin, R.R. 5, Box 410, Greenfield, Ind. 46140

[21] Appl. No.: 37,092

[22] Filed: May 8, 1979

[51] Int. Cl.³ .............................................. B62D 11/04
[52] U.S. Cl. ...................................... 180/6.48; 60/484
[58] Field of Search ................ 180/6.48; 60/484, 424, 60/427, 460; 56/13.6, 15.9

[56] References Cited

U.S. PATENT DOCUMENTS

| Re. 25,379 | 5/1963 | Swanson | 56/13.6 |
| 3,416,311 | 12/1968 | Yoshizawa | 180/6.48 X |
| 3,807,521 | 4/1974 | Sargent | 180/6.48 |
| 3,876,021 | 4/1975 | Baumgartner | 180/6.48 |
| 4,022,022 | 5/1977 | Marietta | 180/6.48 |

Primary Examiner—John A. Pekar

[57] ABSTRACT

A vehicle drive system providing abrupt turning capability under control of local or remote steering commands. The vehicle consists of a platform supported by two drive wheels and at least one castor wheel. An engine powers a hydraulic pump which drives two independently controlled hydraulic motors transmitting power to the drive wheels. Hydraulic fluid flows from the pump to the motor and is controlled through a network of valves to provide torque limiting capabilities to the drive wheels which prevents slippage with the ground. Free wheeling capability is also selectively applied during dynamic turning maneuvers to permit minimal energy changes and resulting in a short turning radius.

12 Claims, 6 Drawing Figures

TRUTH TABLE
AUTOMATIC CONTROL (FORWARD ONLY)

| TURN RIGHT/LEFT | TURN MAGNITUDE HIGH ORDER | TURN MAGNITUDE LOW ORDER | V3 | V1 | V7 REV | V7 FWD | V207 FWD | V207 REV | V201 | V203 | STATUS OF DRIVE | |
|---|---|---|---|---|---|---|---|---|---|---|---|---|
| L | L | L | L | L | L | L | L | L | L | L | STOP | |
| L | L | H | L | H | L | L | H | L | L | L | LEFT TURN | SLIGHT |
| L | H | L | L | L | L | L | H | L | L | H | | MEDIUM |
| L | H | H | L | L | H | L | H | L | L | H | | FULL |
| H | L | L | L | L | L | H | H | L | L | L | STRAIGHT FWD | |
| H | L | H | H | L | L | H | L | L | H | L | RIGHT TURN | SLIGHT |
| H | H | L | H | L | L | L | L | L | L | L | | MEDIUM |
| H | H | H | H | L | L | L | L | H | L | L | | FULL |

H = LOGIC HIGH
L = LOGIC LOW

*FIG. 6*

VEHICLE DRIVE SYSTEM

BACKGROUND OF THE INVENTION

This invention relates to a drive system for a mobile platform having exceptional dynamic maneuvering capability.

Various drive systems have been employed to improve the maneuverability of a mobile platform. Where a small turning radius is required, the usual combination of drive wheels and separate steerable wheels is abandoned. A shorter turning radius is achieved by combining the drive and steering functions to common wheels. An example of this is a bulldozer steel tread drive where the track on one side is driven in reverse while the track on the other side is driven forward. The riding lawnmower industry has utilized small turning radius platforms. Typically, the two rear wheels are independently driven drive wheels and the front wheels are castor wheels. The drive wheels are operational in various combinations of forward or reverse drive to control direction of travel. The castor wheels allow the platform to turn under control of the rear wheels. Both friction drive and hydrostatic drive systems have been employed. U.S. Pat. Nos. 3,306,132 and 3,410,156 to Davis show a drive unit for a friction drive platform. Known drive systems make no controlled provisions for drive slippage, during dynamic turns, between the two drive wheels. In the case of a platform for a lawnmower, one or both of the drive wheels may slide with respect to the ground and causes the wheel to mar the ground.

A second effect is the large amount of energy required to execute a turn. Each drive wheel is simultaneously attempting to apply a force to a moving body. During a substantial portion of the turn, the force applied to the non-pivot wheel is in the wrong direction to obtain an optimum short turn, even though the direction of travel is correct. A substantial energy change is required with resulting delays in the responsiveness of the turn.

A drive system according to the present invention provides torque limited wheel drive to prevent wheel slippage with the travel bed and energy conserving turning capabilities to greatly accelerate the execution of a turn.

The presently disclosed apparatus includes a riding lawnmower platform and drive system which provides control from a hydraulic drive system to execute a dynamic right angle turn at the mowing path. The presently disclosed embodiment illustrates provision for direct manual operation or for an encoded control to be utilized by a remote control point. The encoded control point is also adaptable to a self-controlled steering device where provisions are provided on the mowing platform for sensing a guidance path and translating the information to a drive system control without manual assistance. The platform consists of two rear drive wheels and two castor wheels at the front. One or more castor wheels could be employed for other platform configurations. The swivel wheels are double swivel action castor wheels similar to that shown in U.S. Pat. No. 2,478,035 to Babcock. The double swivel action provides freedom of motion to the platform during abrupt turning maneuvers and enhances the turning response.

The hydraulic drive system and mobile platform embodiment presently disclosed are designed to provide equal drive speed to both hydraulic motors when steering correction control is not employed resulting in equal drive speed to the rear wheels on a platform employing this drive system. Since the drive speeds are locked together, the platform would track straight even on a steep bank. Three degrees of turning control are illustrated. The least degree is effected by applying a braking force of relatively low torque to the pivot drive wheel, while driving the other drive wheel at full speed. This is the only turning maneuver where a fixed drive torque is applied simultaneously at both drive wheels during the start of a turn. The other two degrees of a turn, medium and full turn, provide for a reverse direction torque to be applied at the pivot wheel while allowing the other wheel to free wheel when the momentum of the platform attempts to force this wheel in excess of full speed. When or if this wheel attempts to slow down to less than its full speed, a forward drive torque would then again be applied. During condition of medium or full turn, reverse torque is never applied to the non-pivot wheel. A torque limited brake is applied to the pivot wheel during medium turns. The pivot wheel has a torque limited reverse drive applied during full turn maneuvers.

The hydraulic controls are shown to be solenoid driven which enable them to be operational from an electrical device. An electrically interfaced manual control is also defined. Direct manual control of the hydraulic valves and controls could be implemented to accomplish the function described herein. The electrical control interface permits adaptation of the hydraulic system to electronic control. The electronic control provision permits rapid and frequent adjustment of the controls.

SUMMARY OF THE INVENTION

One embodiment of the present invention is a mobile platform, configured as a lawnmower, comprising a drive means, including a hydraulic drive system. The drive system employs hydraulic controls to selectively torque limit each independently driven drive wheel and selectively permit freewheeling of a drive wheel during a turning maneuver. The hydraulic controls are electronically controllable to adapt the drive system to manual or to automated control systems. The hydraulic drive controls provide for three degrees of turning utilizing degree of torque control, direction of applied torque and selective free wheeling.

It is an object of the present invention to provide a mobile platform capable of extremely short radius dynamic turns.

It is a further object of the present invention to provide such drive system controls to torque limit all drive wheels to prevent slippage at the mating surface.

It is a still further object of the present invention to provide selective free wheeling of the non-pivot wheel during turning maneuvers to effect a minimum energy change of a moving body and permit an optimum short turn.

It is a still further object of the present invention to control the hydraulic drive with an electronic interface.

Further objects and advantages of the present invention shall be apparent from the following detailed description and accompanying figures.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further application of the principles of the invention as illustrated therein being contemplated as would normally occur to one skilled in the art to which the invention relates.

Figure 1:
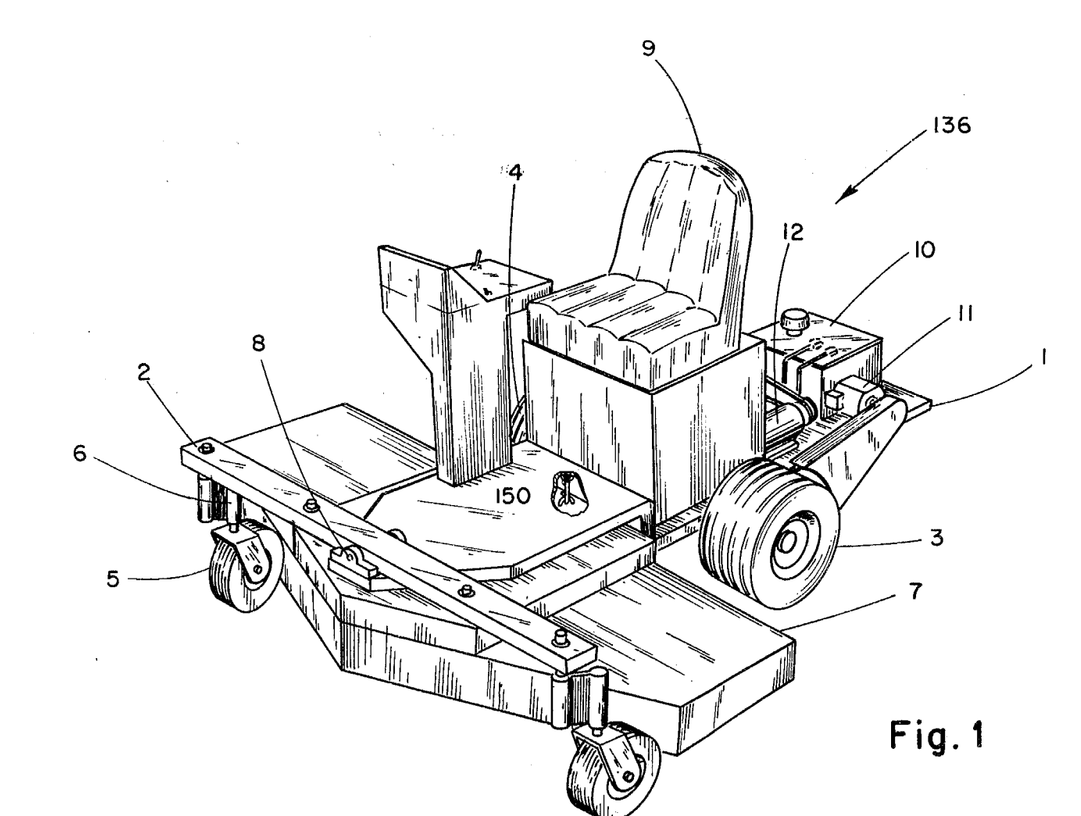
FIG. 1 is a perspective view of a riding lawn mower according to the present invention.

Referring in particular to FIG. 1, there is shown a riding lawnmower apparatus 136 according to the present invention. Mower 136 includes a frame 1 which is supported at three positions consisting of the left rear wheel 3, the right rear wheel 4 and the pivot point 8 on the front axle 2. Front axle 2 is support at each end by a double swivel action caster 6 and attached wheel 5. A mower deck 7 is attached to front axle 2 and frame 1 by suspension member 150. Provisions for manned operation are provided by seat 9. A hydraulic pump 12 is powered by an engine, concealed by the seat structure. Hydraulic motor 11 is shown with chain drive connection to left rear wheel 3. A symetrical hydraulic motor, not shown, provides drive to right rear wheel 4. Hydraulic tank 10 provides an oil reservoir for the hydraulic system.

Figure 2:
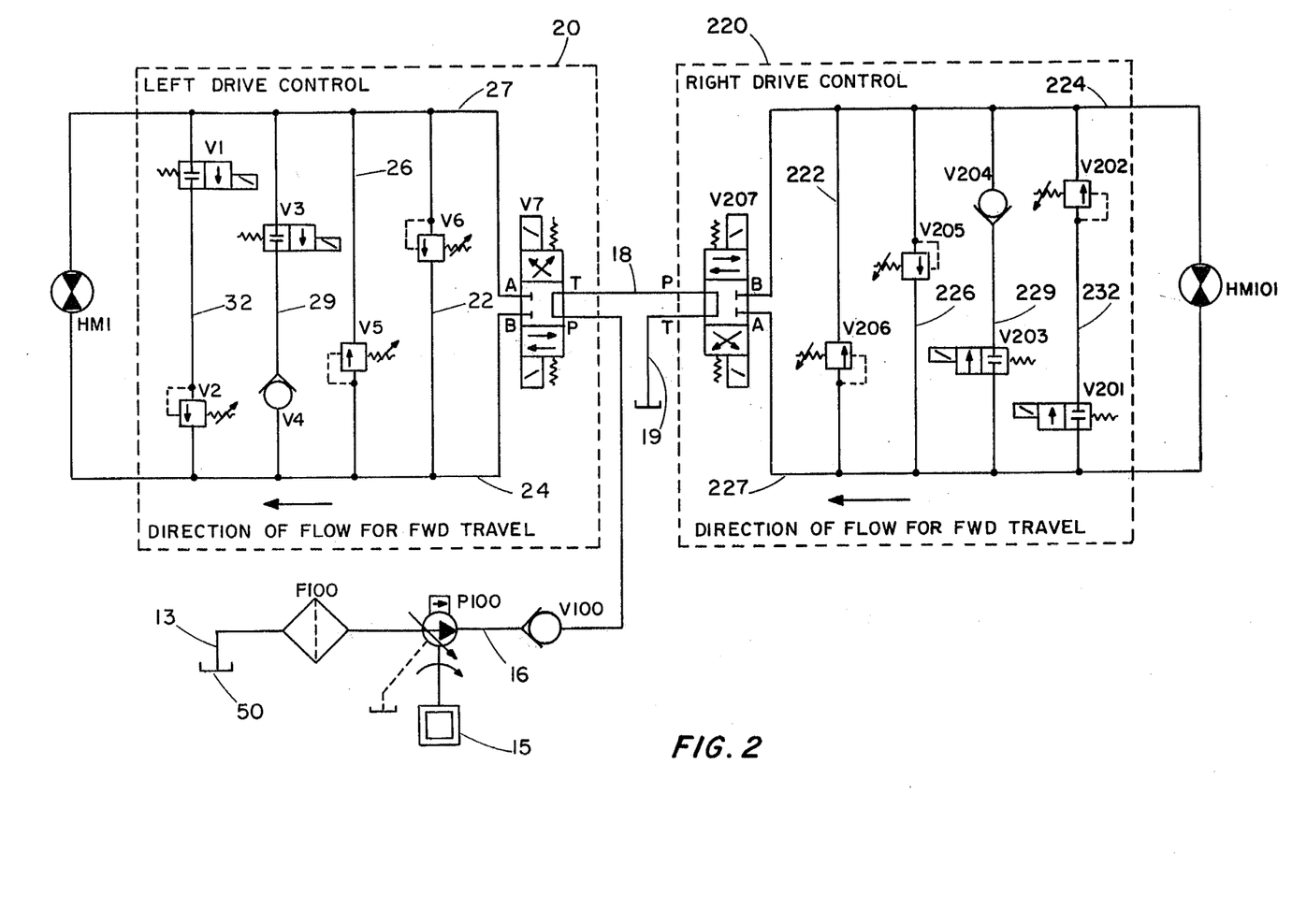
FIG. 2 is a schematic representation of the hydraulic drive system.

Referring now to FIG. 2, the hydraulic circuit controlling the drive applied to the left and right hydraulic motors, HM1 and HM201 respectively, is shown.

The structures of the left drive control 20 and the right drive control 220 are identical. Consequently, only the left drive control 20 will be described in detail. Engine 15 provides the power to drive pump P100. Pump P100 causes fluid to flow from tank 50 through path 13, through oil filter F100, through pump P100, through path 16 and through check valve V100 to the P port of four way valve V7. With valves V7 and V207 in the position shown, the fluid flow is from port P to port T of both valves and through path 19 to the tank 50. With valve V7 in this position, fluid flow from path 24 to path 27 is blocked through valve V7. Consequently, if fluid is not permitted to flow through any of the other valves of left drive control 20, the rotor of hydraulic motor HM1 will be locked. However, if the hydraulic motor HM1 is powering a mobile platform and is in the forward motion prior to switching valve V7 to the position shown, hydraulic motor HM1 acts as a pump creating fluid pressure at point 27 with respect to point 24. When sufficient pressure develops, the adjusted pressure of relief valve V6 will be reached causing it to discharge flow through it at the defined pressure differential. This will cause the hydraulic motor HM1 to resist the forward motion of the mobile platform with a torque proportional to the pressure differential across valve V6. If the mobile platform is in reverse motion prior to switching valve V7 to the position shown, a reversed pressure differential will develop from point 24 to 27 causing relief valve V5 to perform in the same manner as previously described for valve V6. Consequently, a controlled braking torque in either direction is applied if this sequence of events occur. This is the operating mode of the pivot drive wheel during a medium turn. If the mobile platform is in forward motion and valve V7 is placed in the position shown, a relatively high braking force would be experienced by the hydraulic motor HM1 because the pressure setting of valve V6 is relatively large. The pressure setting of valve V2 is relatively small. If the solenoid operating valve V1 is actuated causing a flow through valves V1 and V2, the pressure differential across the hydraulic motor HM1 would be much smaller and the braking torque would be much less. This is the operating mode of the pivot wheel during a slight turning maneuver. With the forward drive solenoid of valve V7 actuated, fluid flow is from the pump P100, through point 24, through hydraulic motor HM1, through point 27 and through point 18 to the right drive control 220. This causes the hydraulic motor HM1 to drive the mobile platform in the forward direction at its left drivewheel. If the mobile platform had additional forces on it trying to cause hydraulic motor HM1 to accelerate, it would develop a pressure differential which would discharge through valve V6 causing a braking torque. However, if the solenoid valve V3 is actuated, flow would be allowed through valve V3 and check valve V4. This would permit the flow rate through hydraulic motor HM1 to freely exceed the flow rate of pump P100 but would not permit it to become less than the pump P100 rate because of the direction of the check valve V4. This is the operating mode of the non-pivot drive wheel during medium or full turn maneuvers. The reverse solenoid of valve V7 is actuated when driving hydraulic motor HM1 in the reverse direction. Pump P100 has characteristics such that once the pressure differential across it reaches a predetermined level, the flow rate decreases to zero or until the pressure is relieved. This prevents heat dissipation when a high pressure is experienced. The pressure limit setting of the pump P100 is less than relief valves V5 and V6 to prevent excessive heat dissipation for most control conditions. Therefore, change of direction control operations utilize the pump P100 pressure limiting operation. This is the operating mode of the pivot drive wheel during the transition into and out of a full turn.

Figure 3:
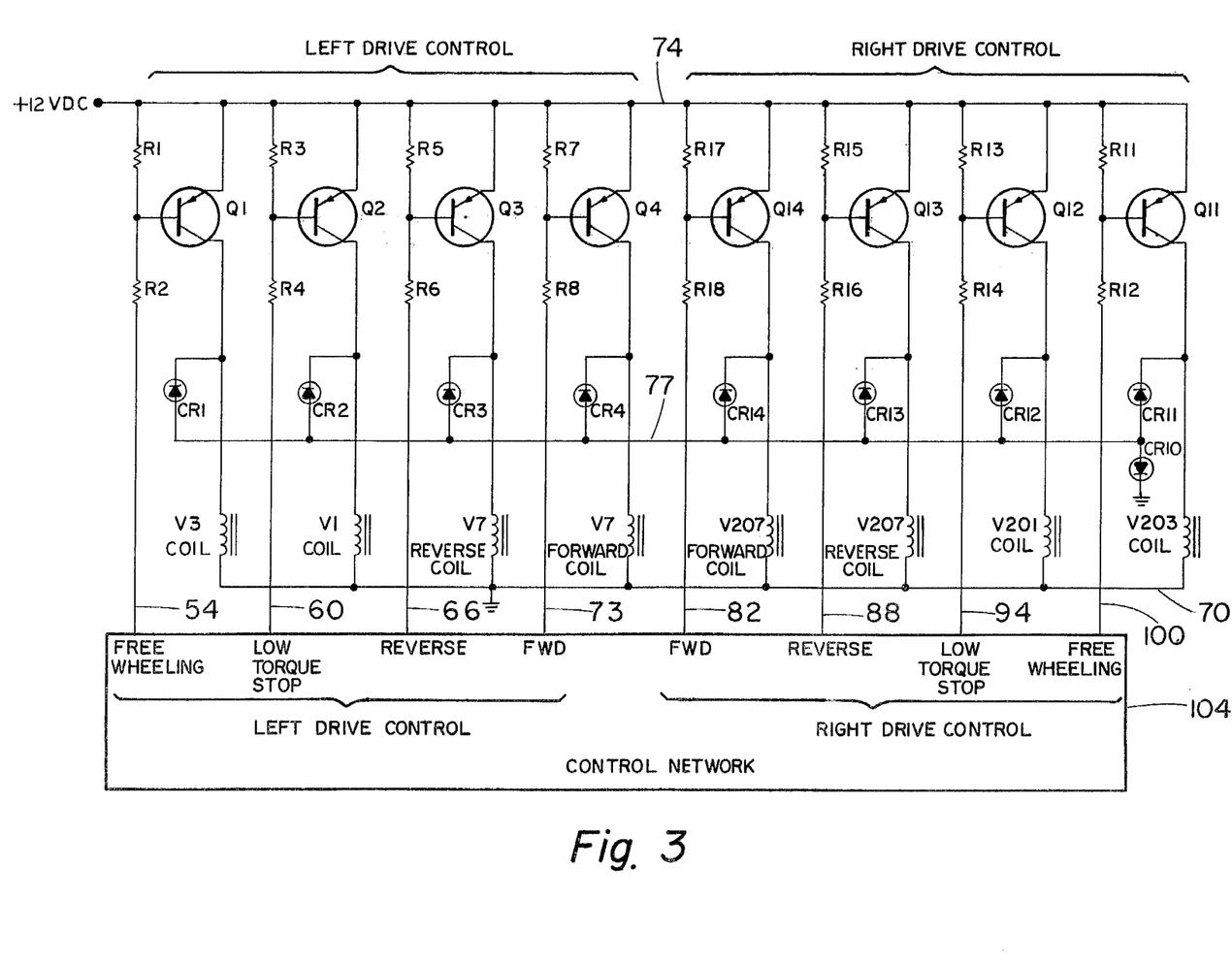
FIG. 3 is a schematic representation of the electrical solenoid drive circuitry.

Referring now to FIG. 3, the electrical solenoid drive circuitry for converting low level control signals to power drive signals is shown.

A typical drive circuit is defined by R1, R2, Q1, CR1 and commonly connected CR10. The circuit drives a typical solenoid coil, in this case the coil of valve V3. With line 54 not connected to ground, point 70, transistor Q1 remains open and the coil of valve V3 remains unenergized. When line 54 is grounded to pivot 70 through control of the control network 104, Q1 becomes conductive and the coil of V3 is energized. When transistor Q1 is again switched to non-conductive, the reverse voltage developed across the coil of V3, due to the inductive energy storage, is clamped by the forward voltage drop of diode CR1 and the reverse voltage drop of zener diode CR10. Diodes CR1 and CR10 provide protection from voltage spikes while permitting rapid energy dissipation. This accelerates the mechanical release of the solenoids. Control network 104 may be replaced by the circuit of FIG. 4 or that of FIG. 5.

Figure 4:
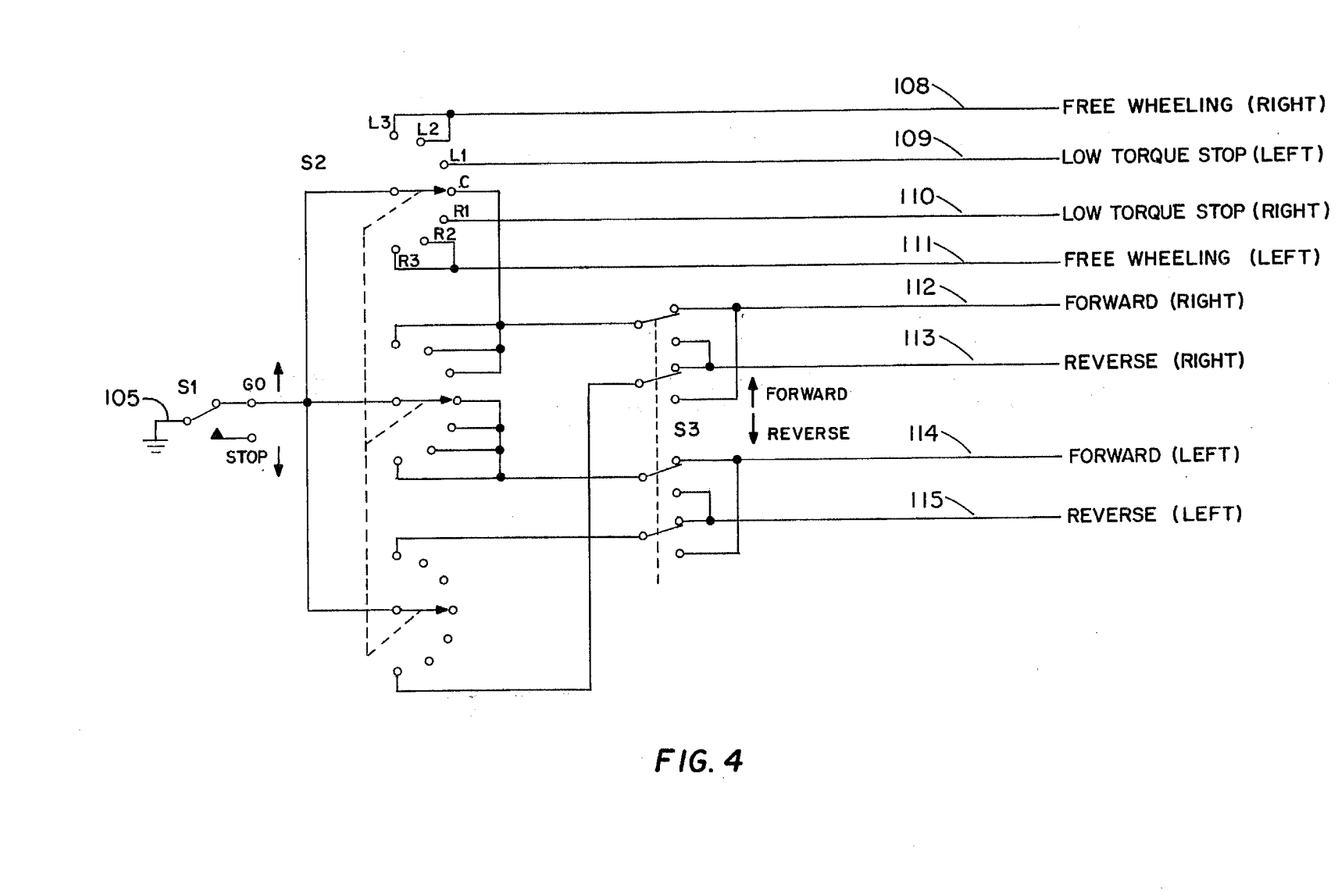
FIG. 4 is a schematic representation of the manual control of the solenoid drive circuitry.

Referring now to FIG. 4, the manual control circuit for the solenoid drive circuit of FIG. 3 is shown. Each of control lines 108 through 115 causes actuation of a solenoid in the circuit of FIG. 3 only when the path is connected to ground 105. If switch S1 is in the stop position, none of the control lines can be connected to ground and fluid flow through the hydraulic motors is blocked causing braking action. With S1 in the go position switch S2 is enabled for control. Switch S2 has a center position, represented by C and representing straight travel and three progressive positions to the left represented by L1, L2 and L3 representing control of slight, medium and full left turns respectively. Switch S2 also has three progressive positions to the right represented by R1, R2 and R3 representing control of slight, medium and full right turns. Switch S3 provides for control of reversal of direction of the mobile platform.

Figure 5:
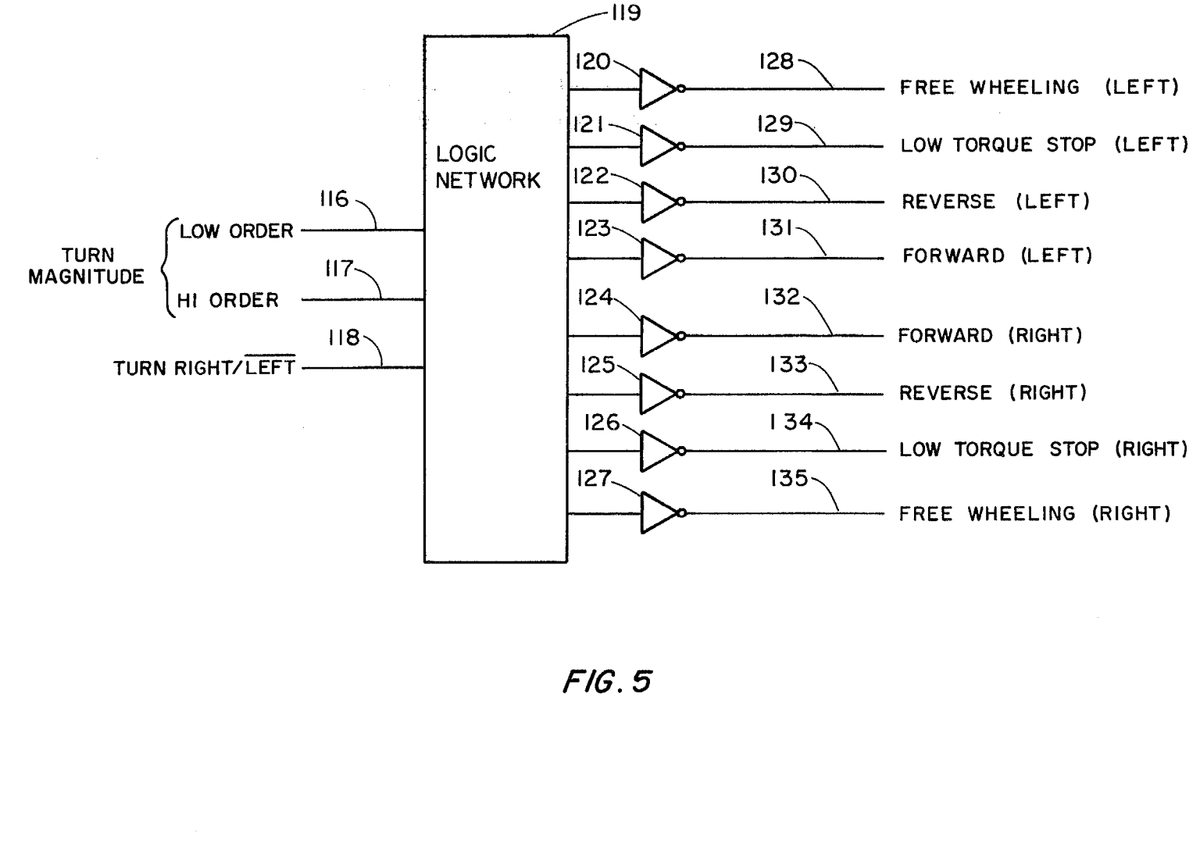
FIG. 5 is a schematic representation of the encoded electronic control of the solenoid drive circuitry.

Referring now to FIG. 5, the encoded control of the solenoid drive circuitry of FIG. 3 is shown for forward travel only. The control lines 128 through 135 provide actuation of the solenoid drive circuit only when grounded. Inverters 120 through 127 are of the open collector type which convert a logic circuit output to a grounded output when actuated. Logic network 119 decodes a three input binary code from lines 116, 117 and 118 to control the eight outputs. Logic network 119 consists of logic gates configured into a circuit common to the state of the art or is a read-only-memory integrated circuit programmed to provide the desired logic.

Figure 6:
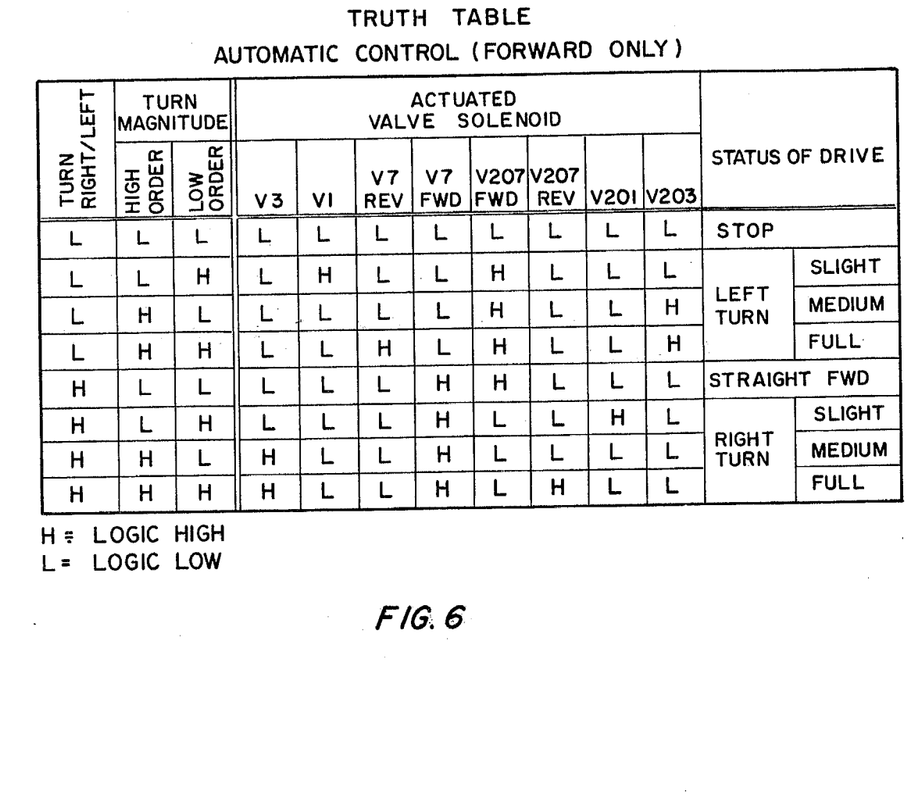
FIG. 6 is a truth table to define the operation of the encoder shown in FIG. 5.

Referring now to FIG. 6, a truth table for the logic states of the outputs verses inputs of the logic network 119 of the circuit of FIG. 5 is shown. The table indicates which valve solenoids are actuated and the drive response resulting.

While there have been described above the principles of this invention in connection with specific apparatus, it is to be clearly understood that this description is made only by way of example and not as a limitation in the scope of the invention. Although the drawings contained herein depict only a lawn mower, the principles described could be applied to any mobile platform. The principles of torque limiting and freewheeling have been mechanized by means of hydraulic control and drive as described herein. However, these techniques could be accomplished by other means known to be state of the art.

What is claimed is:

1. A mobile vehicle apparatus comprising:
mobile platform means, including a first drive wheel and a second drive wheel for propelling the platform and including at least one caster wheel, the platform being supported by the first and second drive wheels and the caster wheel;
power means, including an engine to supply rotational power;
power conversion means for accepting said rotational power from said power means and deriving a power limited source of drive power, the power limited source of drive power causing torque limiting regulation to said first drive wheel and said second drive wheel to prevent drive wheel slippage with the contacting travel bed surface;
first drive control means for accepting said source of drive power and for transmitting and regulating the amount of drive power supplied to said first wheel;
second drive control means for accepting said source of drive power and for transmitting and regulating the amount of drive power supplied to said second drive wheel;
steering control means for applying control to said first drive control means and said second drive control means whereby the direction of travel of said mobile vehicle is determined, both said first drive control means and said second drive control means include a first brake actuator which has the capability to disconnect the drive power under control of the steering control means and to apply a first controlled braking torque to their respective drive wheels to cause a first degree of turn when only one of the two first brake actuators is activated and both the first drive control means and the second drive control means includes a second brake actuator which has the capability to disconnect the drive power and apply second controlled braking torque, of different torque magnitude from that of the first controlled braking torque, to their respective drive wheels to cause a second degree of turn when only one of the two second brake actuators is activated.

2. The apparatus of claim 1 in which the power conversion means includes a hydraulic pump and both the first and second drive control means include a hydraulic motor.

3. The apparatus of claim 2 in which the mobile platform means includes a mower deck.

4. The apparatus of claim 2 in which both the first and second drive control means includes a free wheeling controller which permits the respective drive wheel to be disconnected from the drive power when the free wheeling controller is actuated.

5. A mobile vehicle apparatus comprising:
mobile platform means, including a first drive wheel and a second drive wheel for propelling the platform and including at least one caster wheel, the platform being supported by the first and second drive wheels and the caster wheel;
power means, including an engine to supply rotational power;
power conversion means, including a pressure regulated hydraulic pump for accepting said rotational power from said power means and developing fluid flow to derive a power limited source of drive power, the pressure regulation of the pump provides torque limiting regulation to said first drive wheel and said second drive wheel to prevent drive wheel slippage with the contacting travel bed surface;
first drive control means, including a first hydraulic motor for accepting said source of drive power and for transmitting and regulating the amount of drive power supplied to said first drive wheel, including a first bypass valve across the first hydraulic motor which permits the first drive wheel to be disconnected from the drive power when the first bypass valve is opened to permit free wheeling;
second drive control means, including a second hydraulic motor for accepting said source of drive power and for transmitting and regulating the amount of drive power supplied to said second drive wheel, including a second bypass valve across the second hydraulic motor which permits the second drive wheel to be disconnected from the drive power when the second bypass valve is opened to permit free wheeling;

steering control means, including at least one directional control valve for directing said fluid flow to said first drive control means and said second drive control means whereby the direction of travel of said mobile vehicle is determined, including a bypass valve controller to selectively open no more than one of either the first bypass valve or the second bypass valve.

6. The apparatus of claim 5 in which the mobile platform includes a mower deck.

7. The apparatus of claim 5 in which both the first drive control means and the second drive control means include a first brake actuator which has the capability to disconnect the drive power and apply a first controlled braking torque to their respective drive wheels to cause a first degree of turn when only one of the two first brake actuators is activated.

8. The apparatus of claim 7 in which both the first drive control means and the second drive control means include a second brake actuator which has the capability to disconnect the drive power and apply a second controlled braking torque, of different torque magnitude from that of the first controlled braking torque, to their respective drive wheels to cause a second degree of turn when only one of the two second brake actuators is activated.

9. The apparatus of claim 4 in which the first brake actuator consists of a relief valve connected across the respective hydraulic motor in a first direction and another relief valve connected across the same hydraulic motor in the opposite direction.

10. The apparatus of claim 9 in which the second brake actuator consists of a relief valve connected in series with an on/off valve across the respective hydraulic motor.

11. The apparatus of claim 10 in which the first bypass valve of the first drive control means, the second bypass valve of the second drive control means, the on/off valve of the second brake actuator for both the first drive control means and the second drive control means and also the directional control valve of the steering control means are electrically actuated to provide combinations of direction and degrees of turning.

12. A mobile vehicle apparatus comprising:

mobile platform means, including a first drive wheel and a second drive wheel for propelling the platform and including at least one caster wheel, the platform being supported by the first and second drive wheel and the caster wheel;

power means, including an engine to supply rotational power;

power conversion means for accepting said rotational power from said power means and deriving a power limited source of drive power, the power limited source of drive power causing torque limiting regulation to said first drive wheel and said second drive wheel to prevent drive wheel slippage with the contacting travel bed surface;

first drive control means for accepting said source of drive power and for transmitting and regulating the amount of drive power supplied to said first wheel;

second drive control means for accepting said source of drive power and for transmitting and regulating the amount of drive power supplied to said second drive wheel;

steering control means for applying control to said first drive control means and said second drive control means whereby the direction of travel of said mobile vehicle is determined, both said first drive control means and said second drive control means include a free wheeling controller which permits the respective drive wheel to be disconnected from the drive power when one of the free wheeling controllers is actuated to decrease the turn radius of the mobile vehicle apparatus.

* * * * *